US006442544B1

(12) United States Patent
Kohli (10) Patent No.: US 6,442,544 B1
(45) Date of Patent: Aug. 27, 2002

(54) SYSTEM AND METHOD FOR ORGANIZING SEARCH CATEGORIES FOR USE IN AN ON-LINE SEARCH QUERY ENGINE BASED ON GEOGRAPHIC DESCRIPTIONS

(75) Inventor: Sanjay Kohli, Redmond, WA (US)

(73) Assignee: InfoSpace, Inc., Bellevue, WA (US)

( * ) Notice: Subject to any disclaimer, the term of this patent is extended or adjusted under 35 U.S.C. 154(b) by 0 days.

(21) Appl. No.: 09/208,266

(22) Filed: Dec. 8, 1998

(51) Int. Cl.[7] .............................................. G06F 17/30
(52) U.S. Cl. .................................. 707/5; 707/4; 707/6
(58) Field of Search ................................ 707/1, 2, 3, 4, 707/6, 5

(56) References Cited

U.S. PATENT DOCUMENTS

| | | | | | |
|---|---|---|---|---|---|
| 5,495,605 A | * | 2/1996 | Cadot | .......................... | 395/600 |
| 5,543,788 A | * | 8/1996 | Mikuni | ........................ | 340/990 |
| 5,544,061 A | * | 8/1996 | Morimoto et al. | .......... | 364/444 |
| 5,790,121 A | * | 8/1998 | Sklar et al. | .................. | 345/356 |
| 5,864,863 A | * | 1/1999 | Burrows | ...................... | 707/103 |
| 5,878,385 A | * | 3/1999 | Bralich et al. | ................. | 704/9 |
| 5,893,093 A | * | 4/1999 | Wills | ............................. | 707/5 |
| 5,960,194 A | * | 9/1999 | Choy et al. | ................... | 395/613 |
| 5,966,710 A | * | 10/1999 | Burrows | ...................... | 707/103 |
| 5,974,409 A | * | 10/1999 | Sanu et al. | ..................... | 707/3 |
| 5,995,979 A | * | 11/1999 | Cochran | ...................... | 707/104 |
| 6,052,122 A | * | 4/2000 | Sutcliffe et al. | ............. | 345/331 |
| 6,108,650 A | * | 8/2000 | Musk et al. | .................... | 707/4 |

* cited by examiner

*Primary Examiner*—James P. Trammell
*Assistant Examiner*—Mary Wang (57) ABSTRACT

A system and method for organizing search categories for use in an on-line search query engine based on a geographic description is described. The city list is compiled into entries in a database organized by an official name for each city in the city list. A virtual city list is compiled into entries in a database organized by an unofficial name for each virtual city in a virtual city list. A friendly name list is compiled into entries in a database organized by a pseudonym for each friendly name in a friendly name list. A search query engine includes a user interface receiving a location descriptor presenting the search categories organized by an actual location. The search query engine also includes a resolution module resolving the actual location from the location descriptor using at least one of the official name in the city list, the unofficial name in the virtual city list, and the friendly name in the friendly name list.

27 Claims, 11 Drawing Sheets

OUR SERVICES:     Home | White Pages | Classifieds | Shopping | City Guide | Finance | Community | News Break

[InfoSpace LOGO]

ADVERTISEMENT
Click Here for Advertisement

OUR SPONSORS:     • 1-800-U.S.SEARCH! • HomeAdvisor • Expedia Travel • PC & Mac Zone
• Women.Com • Ship a package • Start Holiday Shopping • GiftTree YOU ARE HERE > Home > Yellow Pages > Business by Category

Business by Category

My Horoscope: What do you need to Know?!

Find businesses by category in any U.S. city
Search Canada | Search U.K.

Enter a city and state (or optionally a ZIP code)
to use as the center point for your search.

City: [ seattle ] — 31
State: [ Washington ] — 32
OR ZIP Code: [ ] — 33

[Find]    [Reset Form]

30

Related Links

[PEOPLE SEARCH CLICK HERE]

More Searches
- Yellow Pages Index
- Search Near Address
- Companies Online
- Fax Numbers
- Toll-Free Numbers
- Maps & Directions
- e-Shopping ADVERTISEMENT
Click Here for Advertisement
Frequently Asked Questions | Contact InfoSpace.com

[InfoSpace LOGO]

Fig. 2B

OUR SERVICES: Home | White Pages | Classifieds | Shopping | City Guide | Finance | Community | News Break

[InfoSpace LOGO]

ADVERTISEMENT
Click Here for Advertisement

OUR SPONSORS:
- 1-800-U.S.SEARCH! • HomeAdvisor • Expedia Travel • PC & Mac Zone
- Women.Com • Ship a package • Start Holiday Shopping • GiftTree YOU ARE HERE > Home > Yellow Pages > Business by Category > Directory

Directory

Businesses in Seattle, WA
Seattle, WA: Business Directory
Search Near Address | New City
Type a category or business name and press Find:
⦿ Category (e.g., coffee)  ○ Name (e.g., Starbucks)
[ Find ]

Or choose one of these main categories:

- Automotive...
- Business Services...
- Computers & Electronics...
- Entertainment...
- Family...
- Finance, Legal & Insurance...

⎫ 36

- Food & Dining...
- Home Improvement...
- Medical...
- Real Estate...
- Retail & Community...
- Travel...

⎫ 36

Professional Guide
Attorneys, Physicians, Accountants...
All Categories: A B C D E F G H I J K L M N O P Q R S T U V W X Y Z
Print Affiliate
BananaPages

35

[InfoSpace LOGO]

ADVERTISEMENT
Click Here for Advertisement

Frequently Asked Questions | Contact InfoSpace.com

Fig. 3A

OUR SERVICES:  Home | White Pages | Classifieds | Shopping | City Guide | Finance | Community | News Break InfoSpace LOGO ADVERTISEMENT
Click Here for Advertisement

OUR SPONSORS:
- 1-800-U.S.SEARCH! • HomeAdvisor • Expedia Travel • PC & Mac Zone
- Women.Com • Ship a package • Start Holiday Shopping • GiftTree YOU ARE HERE > Home > Yellow Pages > Business by Category > Directory

Directory

*My Horoscope: What do you need to Know?!* — 47

Businesses in Ballard, WA
Ballard, WA: Business Directory
Search Near Address | New City
Type a category or business name and press Find:
⦿ Category (e.g., coffee)  ◯ Name (e.g., Starbucks)  [Find]

Or choose one of these main categories:
- Automotive...
- Business Services...
- Computers & Electronics...
- Entertainment...
- Family...
- Finance, Legal & Insurance...
- • • • • • •

- Food & Dining...
- Home Improvement...
- Medical...
- Real Estate...
- Retail & Community...
- Travel...

⎫ 46

Professional Guide
Attorneys, Physicians, Accountants...
All Categories: A B C D E F G H I J K L M N O P Q R S T U V W X Y Z

46 ⎱

45

InfoSpace LOGO

ADVERTISEMENT
Click Here for Advertisement
Frequently Asked Questions | Contact InfoSpace.com

OUR SERVICES:     Home | White Pages | Classifieds | Shopping | City Guide | Finance | Community | News Break InfoSpace LOGO

ADVERTISEMENT

Click Here for Advertisement

OUR SPONSORS:    • 1-800-U.S.SEARCH! • HomeAdvisor • Expedia Travel • PC & Mac Zone
                        • Women.Com • Ship a package • Start Holiday Shopping • GiftTree YOU ARE HERE > Home > Yellow Pages > Business by Category > Directory

Directory

Businesses in Los Angeles, CA    My Horoscope: What do you need to Know?!

Los Angeles, CA: Business Directory — 57

Search Near Address | New City

Type a category or business name and press Find:

⦿ Category (e.g., coffee)   ◯ Name (e.g., Starbucks)   [ Find ]

Or choose one of these main categories:

- Automotive...
- Business Services...
- Computers & Electronics...
- Entertainment...
- Family...
- Finance, Legal & Insurance...

⎫ 56

- Food & Dining...
- Home Improvement...
- Medical...
- Real Estate...
- Retail & Community...
- Travel...

⎫ 56

Professional Guide
Attorneys, Physicians, Accountants...

All Categories: A B C D E F G H I J K L M N O P Q R S T U V W X Y Z

ADVERTISEMENT

Click Here for Advertisement

Frequently Asked Questions | Contact InfoSpace.com

SYSTEM AND METHOD FOR ORGANIZING SEARCH CATEGORIES FOR USE IN AN ON-LINE SEARCH QUERY ENGINE BASED ON GEOGRAPHIC DESCRIPTIONS

FIELD OF THE INVENTION

The present invention relates in general to Internet web page service providers and, in particular, to systems and methods for organizing search categories for use in an on-line search query engine based on geographic descriptions.

BACKGROUND OF THE INVENTION

The use of the Internet as a communications medium has been met with overwhelming acceptance. A wide range of businesses have been spawned by the Internet, such as Internet Service Providers (ISPs). For end users, ISPs offer a portal onto the Internet for electronic mail (email) and World Wide Web (or simply "web") access. For businesses, ISPs provide proxy services, e-mail forwarding and web site content publication services.

In particular, the phenomenon of the web has been tremendously successful for commercial enterprises. The web provides a fast, convenient and relatively low cost means through web sites for reaching a wide audience for advertising and information dissemination. Creating a web site is simple: a business merely needs to compose content and post the content in a web site on the Internet.

Access to web pages over the Internet is typically accomplished via a web browser program operating through a user connection onto the Internet. Web browsers comprise the most popular form of accessing web sites and can be found in a variety of formats. A typical web browser includes provisions for navigating a web site through a graphical user interface used for both receiving search queries and presenting search query results.

A typical search query input by a user is processed by an on-line search engine which then accesses a database of web pages which are sent back to the user in the form of search categories presented as web page content. Search queries typically describe a person, place or thing to be found. Search categories typically describe a set of textual or graphical hyperlinks to be selected until the desired web content is found. On-line search engines which operate in this fashion are known as Yellow Page search directories which assist a user in locating a business. While Page search directories operate similarly, but assist a user in locating a person.

A problem arises when users attempt to process queries containing the geographic names, such as the names of cities or localities. People ordinarily think of cities and localities using descriptions which may not necessarily be recognized as an "official" name. For example, in the United States, the U.S. Census Bureau and the U.S. Postal Service provide listings of cities, towns and localities using names by which they are officially recognized. Residents of those places, though, often use commonly known unofficial names or nicknames for describing a particular part of a city or town which may not be known to persons living outside that area. For example, Ballard, Washington is a local nickname for an area in northwestern Seattle. Similarly, users sometimes use ambiguous words or abbreviations cannot be searched using the official name only. For instance, Mount Vernon, Wash. might be specified in a search query to a search engine as Mount Vernon, Mt Vernon, or Mt. Vernon. Finally, abbreviations or pseudonyms might be used to specify a place, such as NYC instead of New York, N.Y.

Several prior art on-line web search engines attempt to resolve the ambiguities in geographic names. For example, the GTE Superpages.com, Zip2.com, Yahoo.com and Msn.com web sites provide some facilities for resolving geographic name description ambiguities but fail to provide a comprehensive solution providing for official names, unofficial names, local nicknames, abbreviations or initials.

A related prior art approach to resolving the ambiguities in geographic names involves the use of parsers used for string input processing. However, the use of parsers has not gained widespread acceptance for use in on-line search engines on the Internet, such as found with the Yellow Page and White Page directories, that is, online search directories used to identify businesses or persons. Moreover, such prior art parsers do not allow for interactive searches on-line over the Internet and have been used with fixed media, such as CD ROMs. And unlike the Internet, such searches are limited to a fixed input format and lack the capacity and dynamic search behavior found on the Internet.

Finally, a third prior art approach involves the use of telephone prefixes for resolving ambiguities of geographic names. The on-line search engine cross-references a telephone area code or prefix to a geographic name which identifies a city or locality. However, telephone prefixes are unreliable as they are often out of date and would therefore provide bad results. Moreover, telephone prefixes are not typically defined with a high degree of accuracy with respect to neighborhood boundaries and are less desirable for use in an on-line Yellow Pages or White Pages search directory.

Therefore, it would be useful to provide an approach to resolving ambiguities in a geographic name corresponding to an area of a city or town which could be used in a search query engine in an interactive, on-line search.

SUMMARY OF THE INVENTION

The present invention provides a system and method for organizing search categories for use in an on-line search query engine based on a geographic description. A city list is compiled into entries in a database organized by an official name for each city in the city list. A virtual city list is compiled into entries in a database organized by an unofficial name for each virtual city in the virtual city list. A friendly name list is compiled into entries in a database organized by a pseudonym for each friendly name in a friendly name list. A search query engine includes a user interface for receiving a location descriptor and for presenting the search categories organized by an actual location. The search query engine also includes a resolution module for resolving the actual location from the location descriptor using at least one of the official name in the city list, the unofficial name in the virtual city list, and the friendly name in the friendly name list.

Using a web browser, a user can thus enter a search query in the form of a geographic description and receive back search categories organized by an area of a town or city corresponding to that geographic description. This approach avoids the prior art limitations in the field by enabling the user to specify the official name of a geographic location. Alternatively, the user can specified an unofficial name which might be locally known or a pseudonym used as a nickname or "friendly name" for the geographic location.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
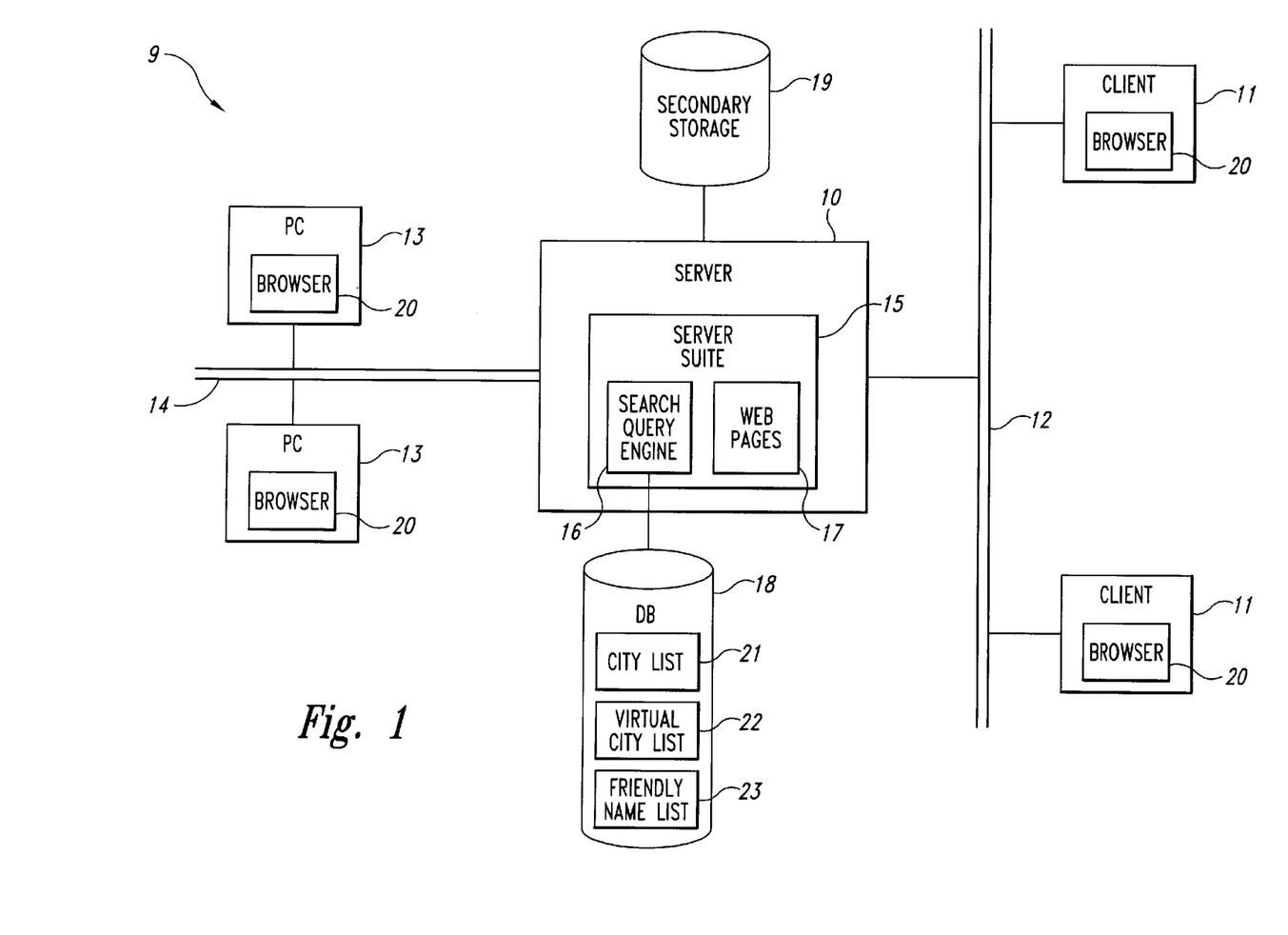
FIG. 1 is a block diagram of the system for organizing search categories for use in an on-line search query engine based on a geographic description in accordance with the present invention.

FIG. 1 is a block diagram of a system 9 for organizing search categories for use in an on-line search query engine 16 based on a geographic description in accordance with the present invention. The system 9 generally operates in a distributed computing environment comprising individual computer systems interconnected over a network, although the system 9 could equally function as a single stand-alone computer system. In the described embodiment, a server 10 is interconnected with a plurality of clients 11 over an internetwork 12, such as the Internet, and with a plurality of personal computers (PCs) 13 interconnected over an intranetwork 14. The server 10 includes a memory (not shown) into which is loaded a server suite 15. The server suite 15 provides the controls and functionality's for an Internet service provider. For example, the server suite 15 publishes web pages 17, thereby making each web page 17 available to the clients 11 and PCs 13 over the internetwork 12 and intranetwork 14, respectively. In accordance with the present invention, the server suite 15 further comprises a search query engine 16 which includes a user interface and a resolution module as further described hereinbelow, beginning with reference to FIG. 8.

The search query engine 16 is coupled to a database 18 into which is compiled a city list 21, a virtual city list 22, and a friendly name list 23. The format of the data structures used in the city list 21, the virtual city list 22 and the friendly name list 23 are further described hereinbelow with reference to FIGS. 5, 6 and 7, respectively. The city list 21, virtual city list 22 and friendly name list 23 are preferably ordered lists.

The server 10 is also interconnected with a secondary storage 19 which can comprise any form of conventional random or non-random access storage device, such as a hard drive or CD ROM player with fixed or removable media, as is known in the art. Each web page 17 is accessed by end users via web browsers 20 operating on each client 11 over the internetwork 12 or on each PC 13 operating over the intranetwork 14. Each client 11 and PC 13 include user interface devices, such as keyboards and monitors (not shown) as is known in the art by which search queries are input and search categories are output.

An exemplary example of a server 10 suitable for use in the present invention is an Intel Pentium-based computer system having the following characteristics: 64 MB RAM, 10.0 GB hard drive, and network server connectivity. In the described embodiment, the server suite 15 is a proprietary server suite written for and used exclusively by InfoSpace.com, Redmond, Washington, which provides functionality similar to the Microsoft Windows NT Server Suite. The proprietary server suite supports a simple page-creation programming language that requires no knowledge of HTML programming or FTP uploads.

Figure 2A:
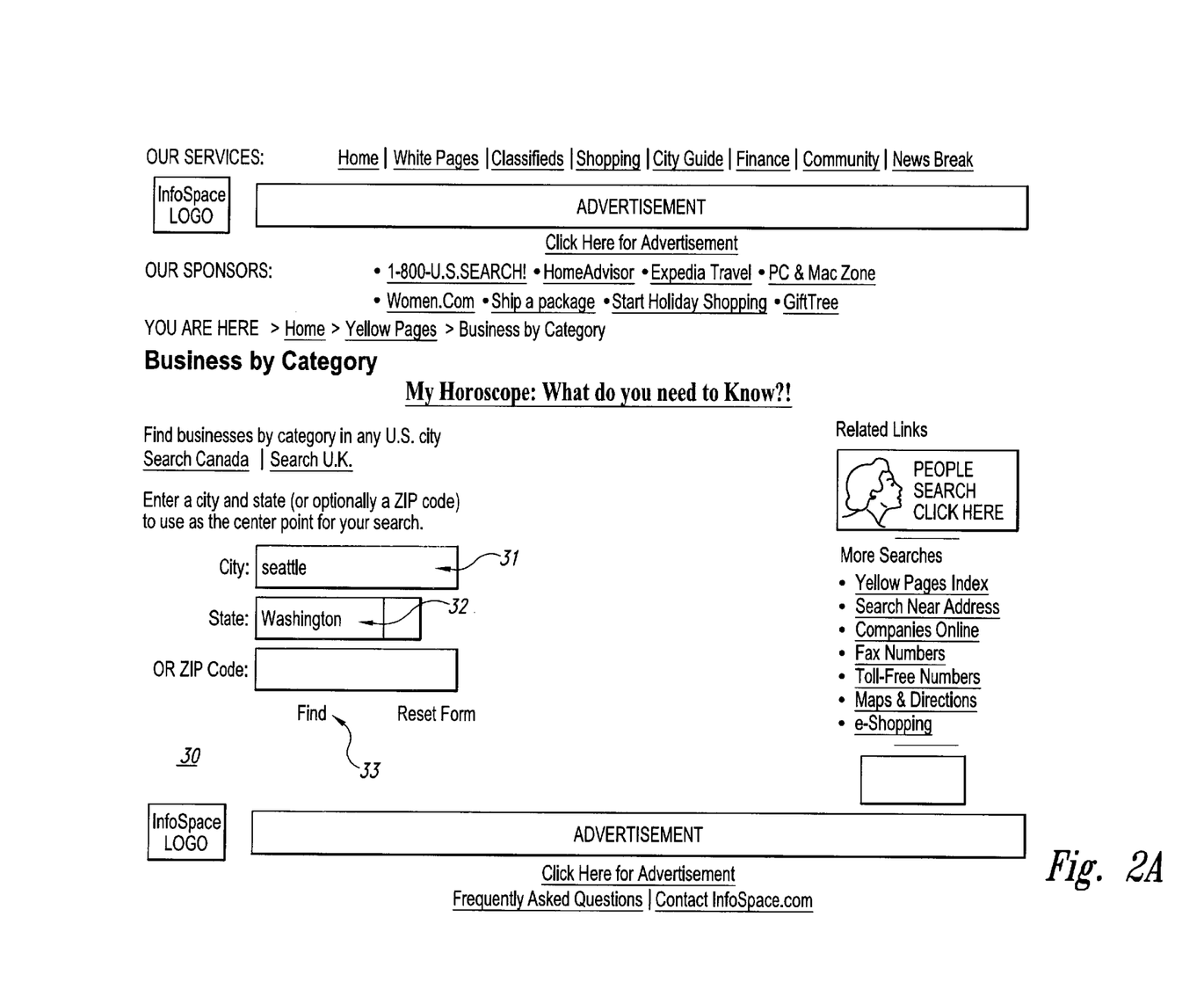
FIGS. 2A and 2B are screen shots of web pages respectively containing a search query and search categories organized by an official name for use in the present invention.

FIG. 2A is a screen shot 30 of a web page 17 shown receiving a search query. Each search query consists of a location descriptor comprising a city entry 31 and a state entry 32. Upon entry of the city entry 31 and the state entry 32, the user presses the find button 33 to initiate the search request on the search query engine 16.

Figure 2B:
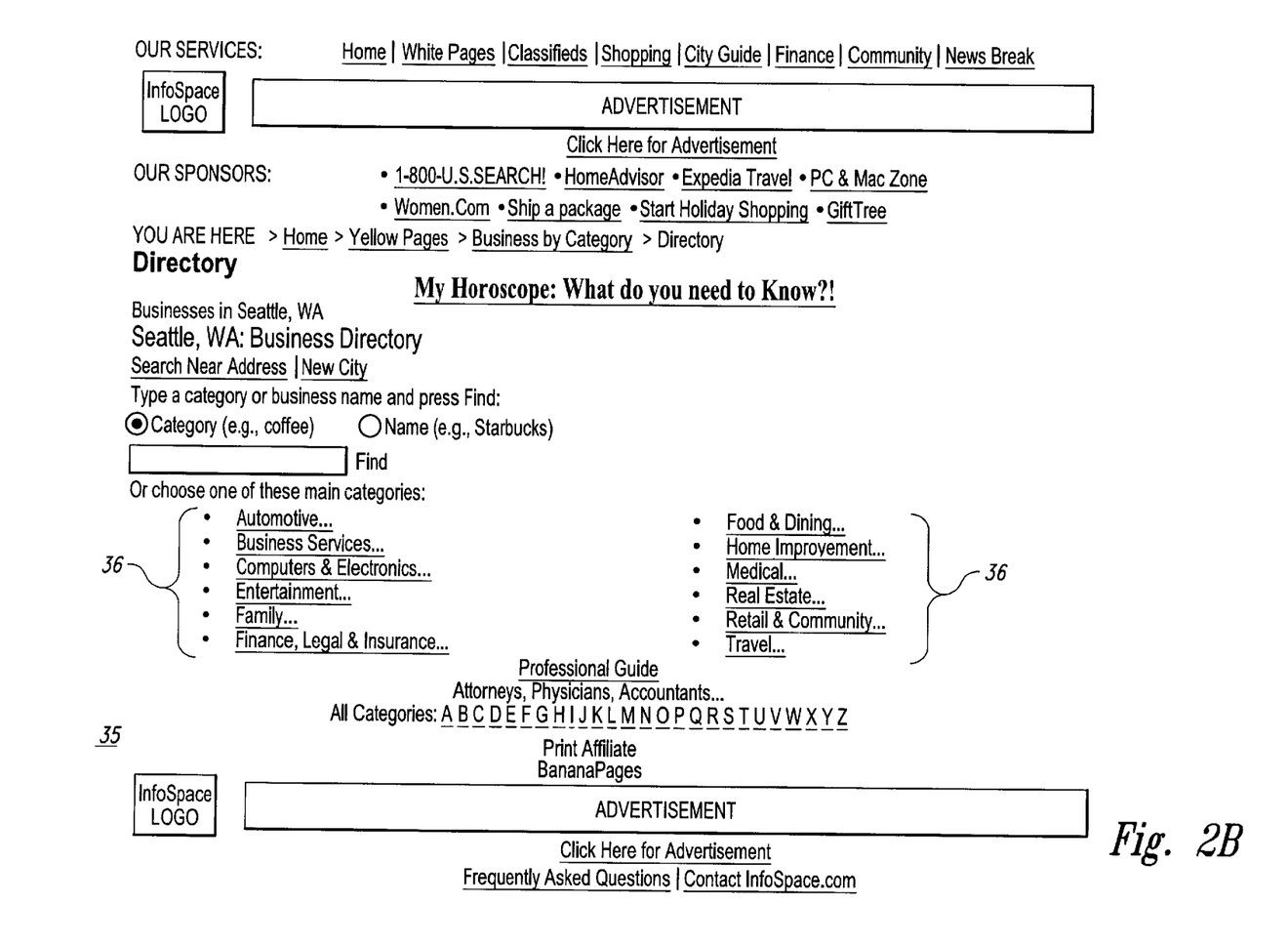

FIG. 2B is a screen shot 35 of a web page 17 showing a set of search categories 36 retrieved responsive to the search request 33 of FIG. 2A. Any type of search category could be displayed assuming the search category could be organized along geographic parameters, such as a city name organized by latitude and longitude.

Figure 3A:
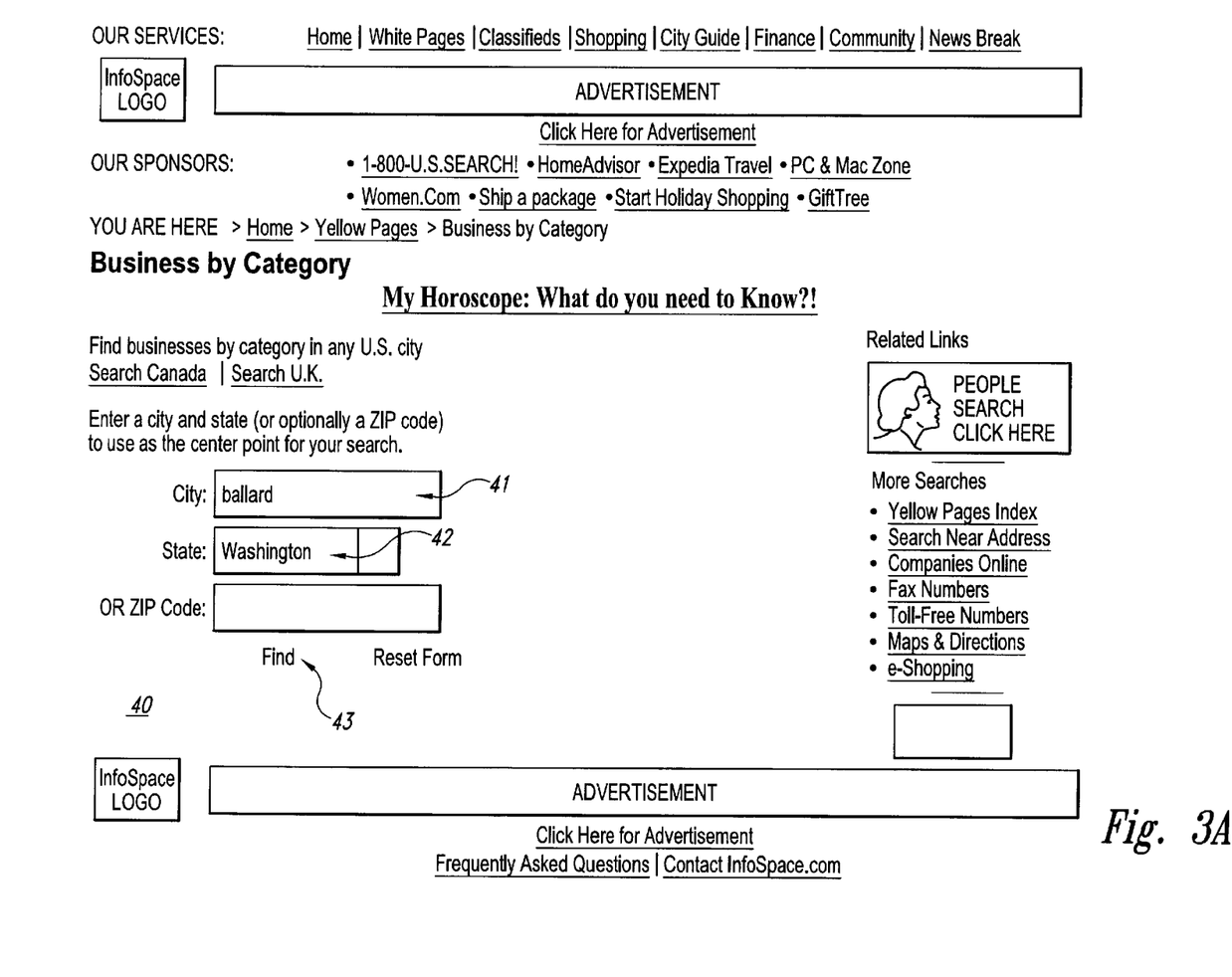
FIGS. 3A and 3B are screen shots of web pages respectively containing a search query and search categories organized by an unofficial name for use in the present invention.

FIG. 3A is a screen shot 40 of a web page 17 shown receiving a search query. Each search query consists of a location descriptor comprising a city entry 41 and a state entry 42. Upon entry of the city entry 41 and the state entry 42, the user presses the find button 43 to initiate the search request on the search query engine 16.

Figure 3B:
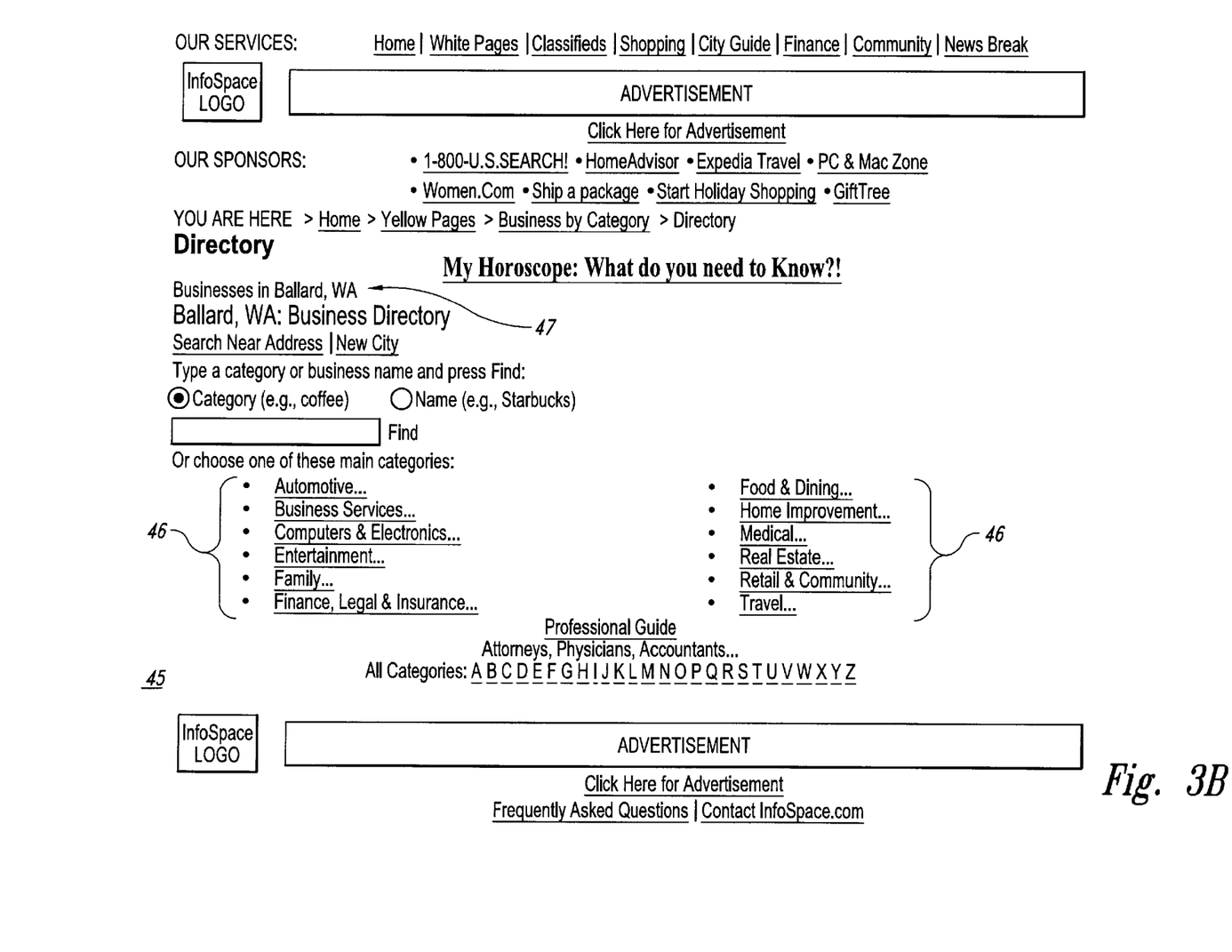

FIG. 3B is a screen shot 45 of a web page 17 showing a set of search categories 46 retrieved responsive to the search request 43 of FIG. 3A. Any type of search category could be displayed assuming the search category could be organized along geographic parameters, such as a city name organized by latitude and longitude. The screen shot 45 shows those search categories falling within a five mile radius 47 of the city entry 41 and state entry 42.

Figure 4A:
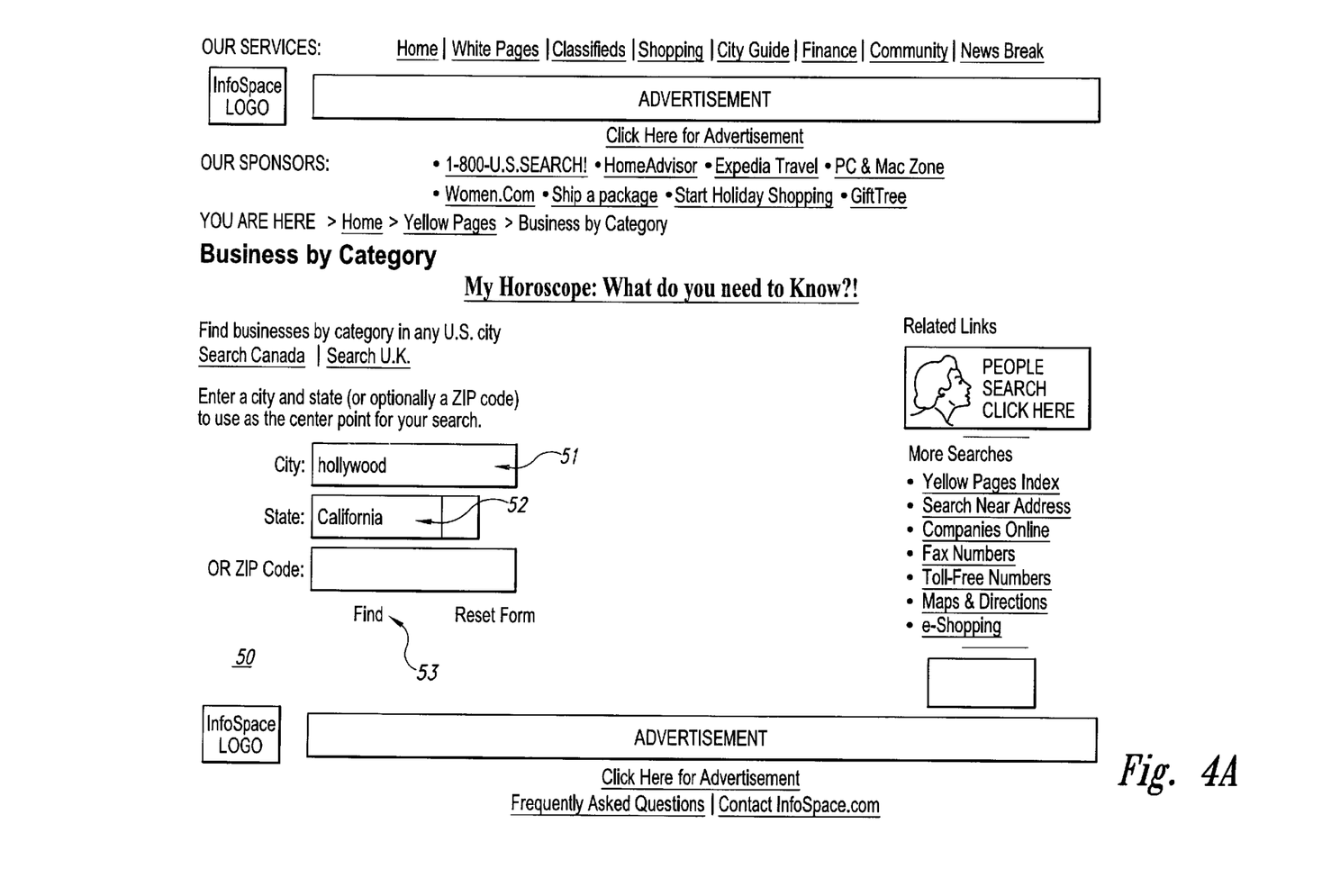
FIGS. 4A and 4B are screen shots of web pages respectively containing a search query and search categories organized by a pseudonym for use in the present invention.

FIG. 4A is a screen shot 50 of a web page 17 shown receiving a search query. Each search query consists of a location descriptor comprising a city entry 51 and a state entry 52. Upon entry of the city entry 51 and the state entry 52, the user presses the find button 53 to initiate the search request on the search query engine 16.

Figure 4B:
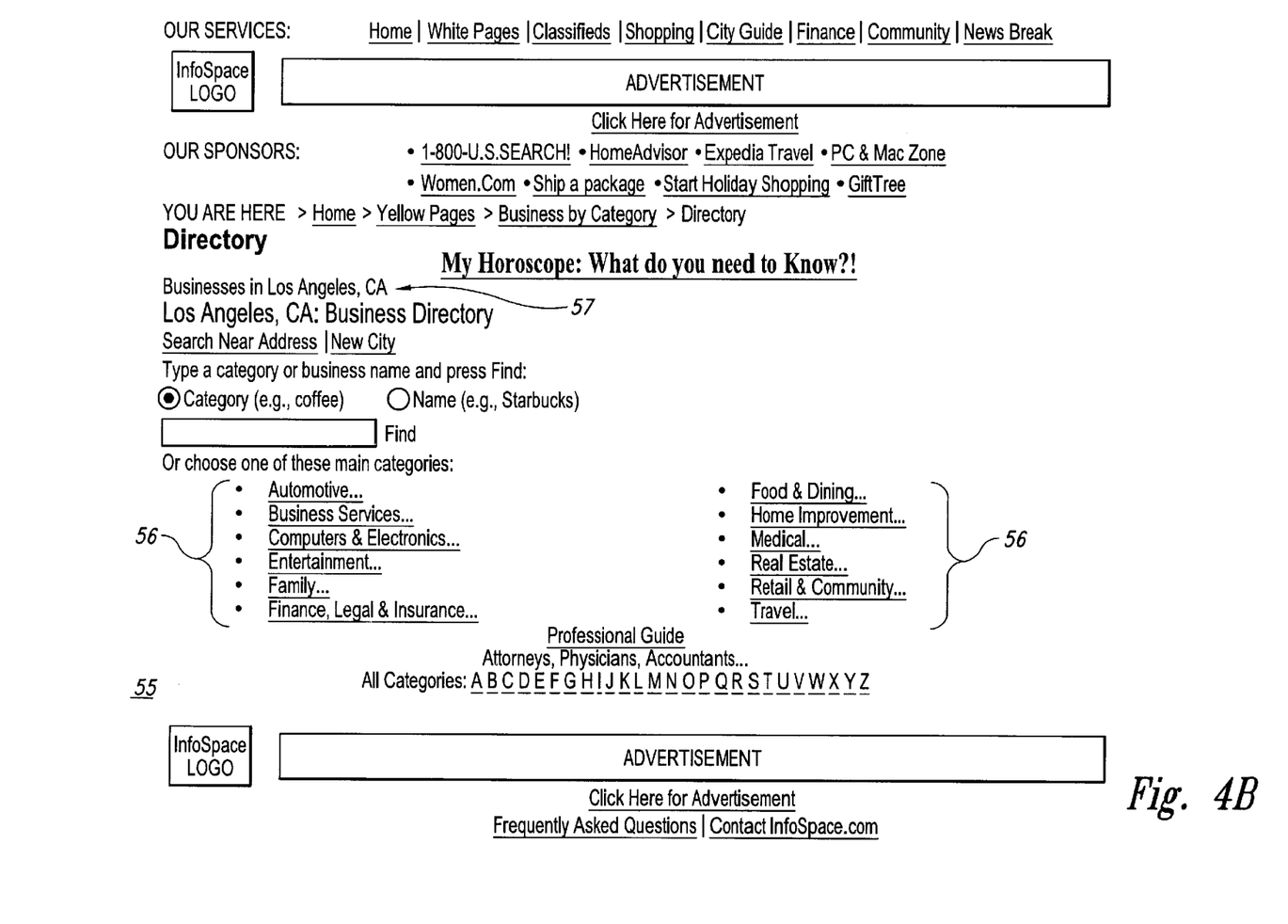

FIG. 4B is a screen shot 55 of a web page 17 showing a set of search categories 56 retrieved responsive to the search request 53 of FIG. 4A. Any type of search category could be displayed assuming the search category could be organized along geographic parameters, such as a city name organized by latitude and longitude. The screen shot 55 shows those search categories falling within a five mile radius 57 of the city entry 51 and state entry 52.

Figure 5:
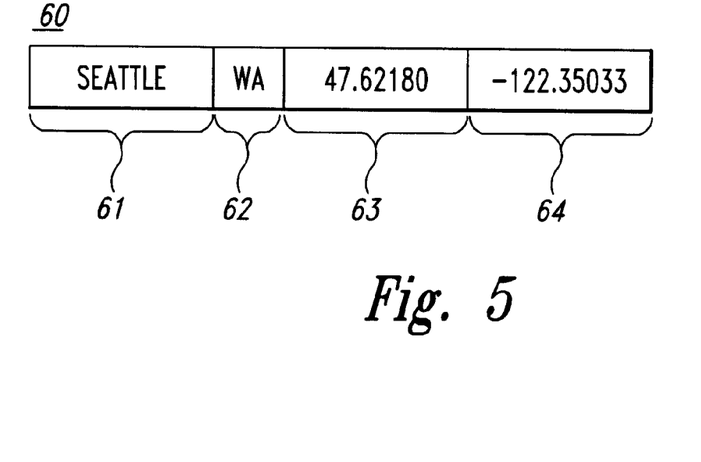
FIG. 5 is a data structure showing the layout of an entry in the city list for use in the system of FIG. 1.

FIG. 5 is a data structure showing the layout of an entry 60 in the city list 21 (shown in FIG. 1). Each entry 60 consists of an official city name 61, a state name 62, a latitude 63, and a longitude 64.

Figure 6:
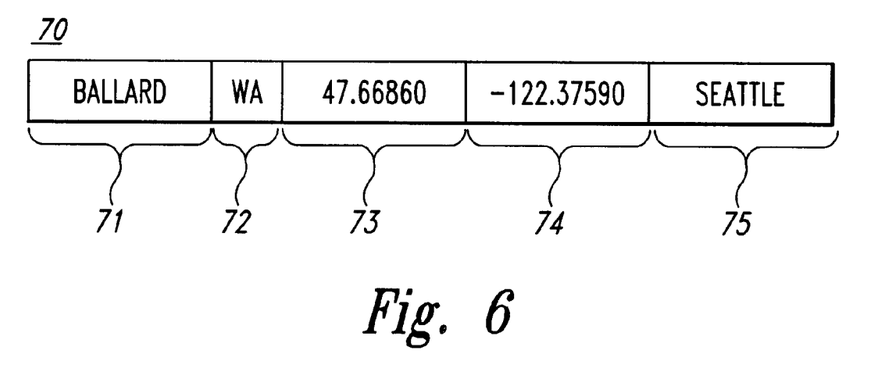
FIG. 6 is a data structure showing the layout of an entry in the virtual city list for use in the system of FIG. 1.

FIG. 6 is a data structure showing the layout of an entry 70 in the virtual city list 22 (shown in FIG. 1). Each entry 70 consists of a virtual city name 71, a state name 72, a latitude 73, a longitude 74, and an official city name 75. A virtual name 70 can be an unofficial name for a neighborhood, borough or section of a city or town which might be used informally in lieu of the official city name 75.

Figure 7:
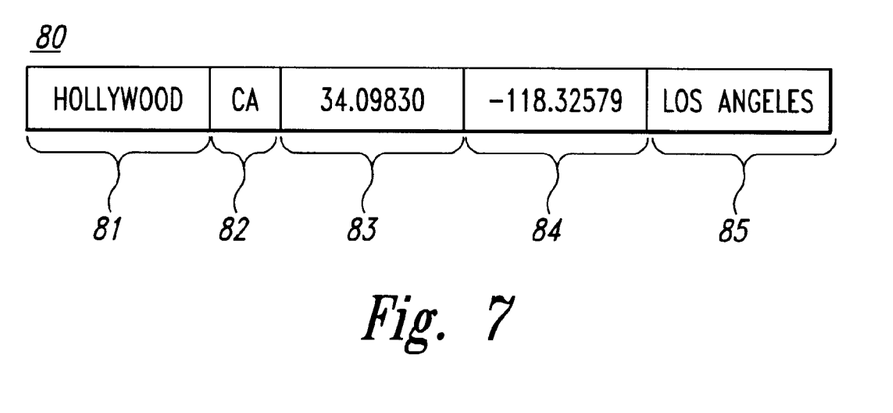
FIG. 7 is a data structure showing the layout of an entry in the friendly name list for use in the system of FIG. 1.

FIG. 7 is a data structure showing the layout of an entry 80 in the friendly name list 23 (shown in FIG. 1). Each entry 80 consists of a friendly name 81, a state name 82, a latitude 83, a longitude 84, and an official city name 85. The friendly name 81 can be a pseudonym or nickname, such as "NYC" as a nickname for New York, N.Y., which might be used informally in lieu of the official city name 85.

The virtual city list 22 and the friendly name list 23 include information compiled from third party sources, such as the U.S. Census Bureau, U.S. Postal Service, private databases or publishers. Each city in these lists is identified and plotted to obtain their latitudes and longitudes before being entered into the virtual city list 22 or the friendly name list 23. Other entries into these lists can be made upon user request.

Figure 8:
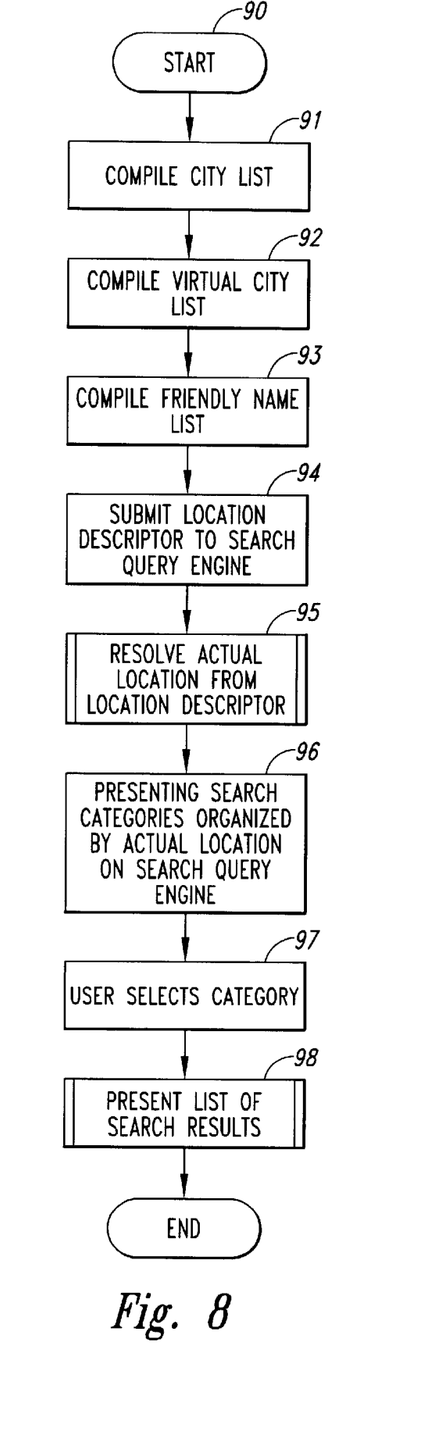
FIG. 8 is a flow diagram of a method for organizing search categories for use in an on-line search query engine based on a geographic description in accordance with the present invention.

FIG. 8 is a flow diagram of a method 90 for organizing search categories 36, 46, 56 for use in an on-line search query engine 16 (shown in FIG. 1) based on a geographic description in accordance with the present invention. A city list 21 (shown in FIG. 1) is compiled into entries 60 stored in the database 18 and organized by the official name 61 for each city entry 60 in the city list (block 91). A virtual city list 22 (shown in FIG. 1) is compiled into entries 70 in the database 1I organized by the unofficial name 71 for each virtual city entry 70 in the virtual city list 22 (block 92). A friendly name list 23 (shown in FIG. 1) is compiled into entries 80 stored in the database 18 organized by the friendly name 81 for each friendly name entry 80 in the friendly name list 23 (block 93). The user submits a location descriptor, such as a city name 31, 41, 51 and a state name 32, 42, 52 via a web browser (block 94). The search query engine 16 resolves an actual location from the location descriptor using at least one of the official name 61 in the city list 21, the virtual city name 71 and the virtual city list 22 or the friendly name 81 in the friendly name list 23 (block 95) as further described hereinbelow with reference to FIG. 9. The search query engine 16 presents search categories 36, 46, 56 to the end user organized by the actual location of the geographic descriptor (block 96) and the user selects a category (block 97). Finally, the search query engine 16 presents a list of search results to the user (block 98), as further described hereinbelow with reference to FIG. 12.

Figure 9:
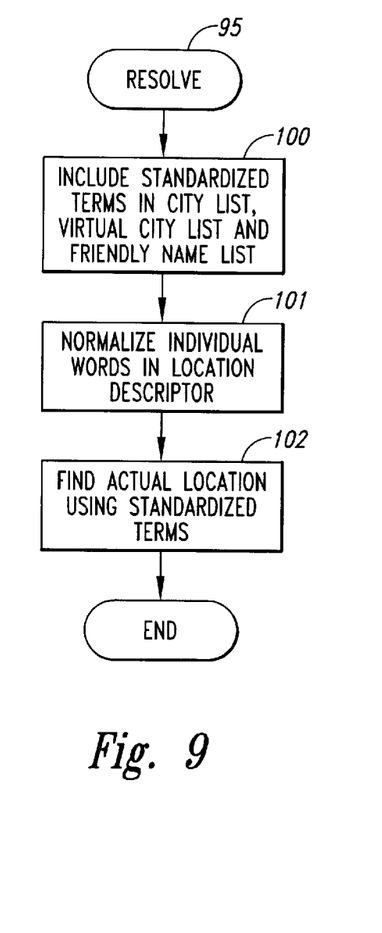
FIG. 9 is a flow diagram of a routine for resolving an actual location for use in the method of FIG. 8.

FIG. 9 is a flow diagram of a routine for resolving an actual location 95 for use in the method of FIG. 8. Each city name 61, virtual city name 71, and friendly name 81 in the city list 21, the virtual city list 22, and the friendly name list 23, respectively, include standardized terms for abbreviations and alternate spellings (block 100). For example, the city Saint Louis might be stored in the city list 21 as "Saint Louis." However, a user might enter "St. Louis," "St Louis," or "Saint Louis." Any of these forms of describing the city of Saint Louis are correct. However, only the standardized form of "Saint Louis" will be recognized as an entry 60 in the city list 21. Consequently, the search query engine 16 will normalize individual words in the location descriptor by employing a lookup table of common abbreviations and alternate spellings for terms such as "Saint" (block 101). Finally, the actual location of the place being searched by the user is determined using the standardized terms (block 102) as further described hereinbelow with reference to FIG. 10.

Figure 10:
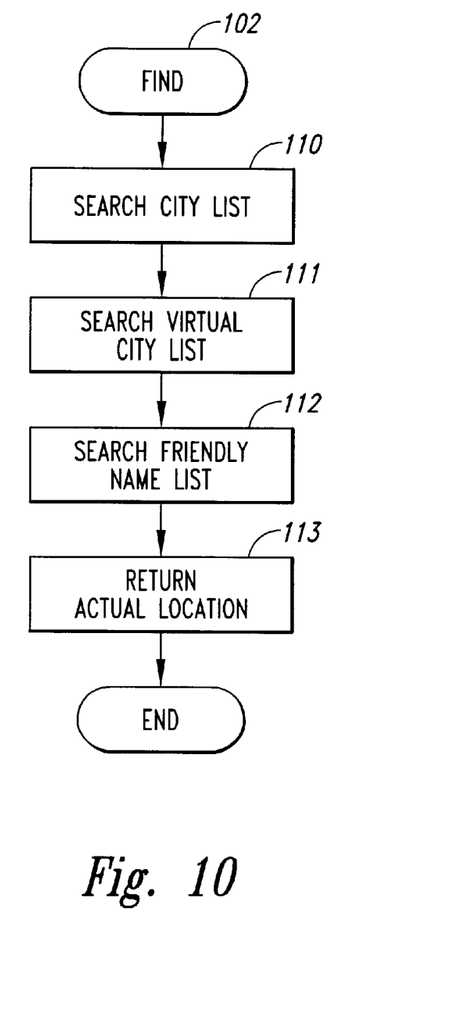
FIG. 10 is a flow diagram of a routine for finding an actual location for use in the routine of FIG. 9.

FIG. 10 is a flow diagram of a method for finding an actual location 102 for use in the method of FIG. 9. Each list in the database 18 is searched in turn. Thus, the city list is searched by city name 61 (block 110). The virtual city list 22 is searched by virtual city name 71 (block 111) if the city list search fails (block 110). Finally, the friendly name list 23 is searched by the friendly name 81 (block 112) if the city list and virtual city list searches fail (blocks 110, 111). Finally, the actual location, if found, is returned to the search query engine (block 113).

Figure 11:
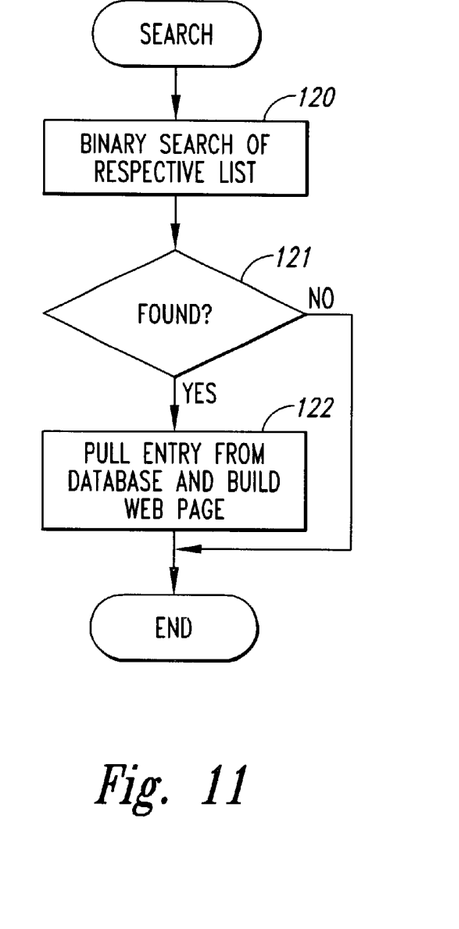
FIG. 11 is a flow diagram of a search routine for use in the routine of FIG. 10.

FIG. 11 is a flow diagram of a search routine for use in the routine of FIG. 10. A binary search of each respective list, that is, the city list 21, the virtual city list 22 and the friendly name list 23, is performed (block 120), although any type of search technique used on an ordered list could also be employed. If a match for the geographic descriptor is found (block 121), the appropriate entry 60, 70, 80 is pulled from the database 18 and the search category web page 35, 45, 55 is built (block 122).

Figure 12:
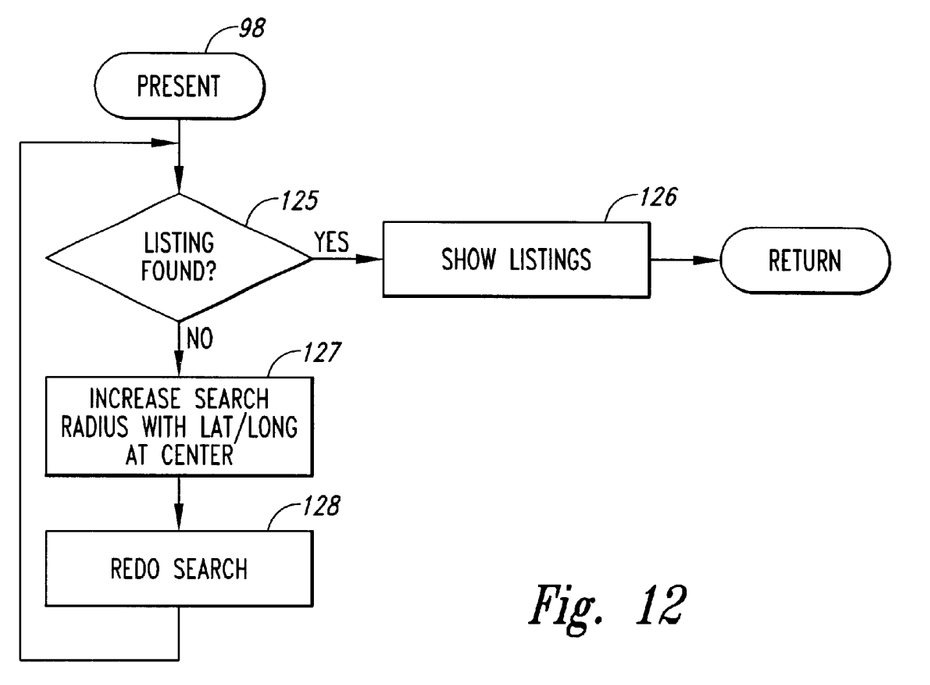
FIG. 12 is a flow diagram of a routine for presenting search results for use in the method of FIG. 8.

The search query engine 16 builds each search category web page 35, 45, 55 using the latitude 63, 73, 83 and longitude 64, 74, 84 of the respective database entry 60, 70, 80. An embedded command in HTML is associated with each hyperlink (not shown) corresponding to each search category 36, 46, 56, FIG. 12 is a flow diagram of a routine for presenting the search results to the user for use in the method of FIG. 8. Once the user has selected a search category 36, 46, 56 (block 97 in FIG. 8), the search query engine 16 presents a list of search results to the user, such as a listing of businesses for a Yellow Pages search engine or a listing of names for a White Pages search engine (block 98 in FIG. 8) and the user is prompted to select one of the listings. If the listing for which the user is searching is found (block 125), the search query engine 16 shows the details of the listing to the user (block 126) and the routine returns. Otherwise, if the listing is not found (block 125), the search radius 47, 57, for instance, measured in miles, is increased by some metric, such as five miles with the latitude and longitude of the actual location at the center (block 126) and the search is redone (block 128). The search radius is iteratively expanded by fixed increments until a listing is found (block 125) or the user terminates the search. Other methods of increasing a search radius are possible, such as using kilometers or street boundaries.

Although the described embodiment uses city names and search categories throughout, the invention is equally applicable to other types of geographic terms and forms of search query results. As well, the invention could be applied to White Page directories used for locating persons as well as the Yellow Page search directories in which the invention is currently applied.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for organizing search categories for use in an on-line search query engine based on a geographic description, comprising:

a city list compiled into entries in a database organized by an official name for each city in the city list;

a virtual city list compiled into entries in a database organized by an unofficial name for each virtual city in the virtual city list;

a friendly name list compiled into entries in a database organized by a pseudonym for each friendly name in the friendly name list; and a search query engine including:
   a user interface receiving a location descriptor and presenting the search categories organized by an actual location, and
   a resolution module resolving the actual location from the location descriptor using at least one of the official name in the city list, the unofficial name in the virtual city list and the friendly name in the friendly name list.

2. A system according to claim 1, further comprising:

standardized terms included in at least one database entry for the city list, the virtual city list and the friendly name list; and the search query engine further comprising:
   a normalization module normalizing individual words in the location descriptor into standardized terms, and
   a search module finding the actual location in the city list, the virtual city list and the friendly name list using the standardized terms.

3. A system according to claim 2, wherein each standardized term corresponds to at least one of an abbreviation or an alternate spelling for individual words in the location descriptor.

4. A system according to claim 1, the search query engine further comprising:
   a search module searching, in turn, each of:
      the city list for one such database entry having the official name corresponding to the location descriptor,
      the virtual city list for one such database entry having the unofficial name corresponding to the location descriptor, and
      the friendly name list for one such database entry having the friendly name corresponding to the location descriptor; and
      returning the actual location from the one such database entry from one of the city list, the virtual city list and the friendly name list.

5. A system according to claim 4, wherein each of the city list, the virtual city list and the friendly name list are searched using a binary search.

6. A system according to claim 1, wherein the user interface provides the official name as the actual location for each location descriptor resolved using the city list.

7. A system according to claim 1, wherein the user interface provides the unofficial name as the actual location for each location descriptor resolved using the virtual city list.

8. A system according to claim 1, wherein the user interface provides a latitude and a longitude as the actual location for each location descriptor resolved using the friendly name list.

9. A system according to claim 8, wherein the resolution module iteratively increases a radius used in identifying search results with the latitude and the longitude of the actual location specifying a center of the radius.

10. A method for organizing search categories for use in an on-line search query engine based on a geographic description, comprising:

compiling a city list into entries in a database organized by an official name for each city in the city list;

compiling a virtual city list into entries in a database organized by an unofficial name for each virtual city in the virtual city list;

compiling a friendly name list into entries in a database organized by a pseudonym for each friendly name in the friendly name list;

submitting a location descriptor to the search query engine;

resolving an actual location from the location descriptor using at least one of the official name in the city list, the unofficial name in the virtual city list and the friendly name in the friendly name list; and presenting the search categories organized by the actual location on the search query engine.

11. A method according to claim 10, the operation of resolving an actual location further comprising:

including standardized terms in at least one database entry for the city list, the virtual city list and the friendly name list;

normalizing individual words in the location descriptor into standardized terms; and finding the actual location in the city list, the virtual city list and the friendly name list using the standardized terms.

12. A method according to claim 11, wherein each standardized term corresponds to at least one of an abbreviation or an alternate spelling for individual words in the location descriptor.

13. A method according to claim 10, the operation of resolving an actual location further comprising:

searching, in turn, each of:
   the city list for one such database entry having the official name corresponding to the location descriptor,
   the virtual city list for one such database entry having the unofficial name corresponding to the location descriptor, and
   the friendly name list for one such database entry having the friendly name corresponding to the location descriptor; and
   returning the actual location from the one such database entry from one of the city list, the virtual city list and the friendly name list.

14. A method according to claim 13, wherein each of the city list, the virtual city list and the friendly name list are searched using a binary search.

15. A method according to claim 10, the operation of resolving an actual location further comprising:

providing the official name as the actual location for each location descriptor resolved using the city list.

16. A method according to claim 10, the operation of resolving an actual location further comprising:

providing the unofficial name as the actual location for each location descriptor resolved using the virtual city list.

17. A method according to claim 10, the operation of resolving an actual location further comprising:

providing a latitude and a longitude as the actual location for each location descriptor resolved using the friendly name list.

18. A method according to claim 17, the operation of presenting the search categories further comprising:

iteratively increasing a radius used in identifying search results with the latitude and the longitude of the actual location specifying a center of the radius.

19. A computer-readable storage medium holding instructions for organizing search categories for use in an on-line search query engine based on a geographic description, comprising:
- a city list compiled into entries in a database organized by an official name for each city in the city list;
- a virtual city list compiled into entries in a database organized by an unofficial name for each virtual city in the virtual city list;
- a friendly name list compiled into entries in a database organized by a pseudonym for each friendly name in the friendly name list; and
- a search query engine including:
  - a user interface receiving a location descriptor and presenting the search categories organized by an actual location, and
  - a resolution module resolving the actual location from the location descriptor using at least one of the official name in the city list, the unofficial name in the virtual city list and the friendly name in the friendly name list.

20. A storage medium according to claim 19, further comprising:
- standardized terms included in at least one database entry for the city list, the virtual city list and the friendly name list; and
- the search query engine further comprising:
  - a normalization module normalizing individual words in the location descriptor into standardized terms, and
  - a search module finding the actual location in the city list, the virtual city list and the friendly name list using the standardized terms.

21. A storage medium according to claim 20, wherein each standardized term corresponds to at least one of an abbreviation or an alternate spelling for individual words in the location descriptor.

22. A storage medium according to claim 19, the search query engine further comprising:
- a search module searching, in turn, each of:
  - the city list for one such database entry having the official name corresponding to the location descriptor,
  - the virtual city list for one such database entry having the unofficial name corresponding to the location descriptor, and
  - the friendly name list for one such database entry having the friendly name corresponding to the location descriptor; and
- returning the actual location from the one such database entry from one of the city list, the virtual city list and the friendly name list.

23. A storage medium according to claim 22, wherein each of the city list, the virtual city list and the friendly name list are searched using a binary search.

24. A storage medium according to claim 19, wherein the user interface provides the official name as the actual location for each location descriptor resolved using the city list.

25. A storage medium according to claim 19, wherein the user interface provides the unofficial name as the actual location for each location descriptor resolved using the virtual city list.

26. A storage medium according to claim 19, wherein the user interface provides a latitude and a longitude as the actual location for each location descriptor resolved using the friendly name list.

27. A storage medium according to claim 26, wherein the resolution module iteratively increases a radius used in identifying search results with the latitude and the longitude of the actual location specifying a center of the radius.

* * * * *